United States Patent
Yang

(10) Patent No.: US 10,908,051 B2
(45) Date of Patent: Feb. 2, 2021

(54) TESTING METHOD AND APPARATUS APPLICABLE TO DRIVERLESS VEHICLE

(71) Applicant: Baidu Online Network Technology (Beijing) Co., Ltd., Beijing (CN)

(72) Inventor: Guang Yang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 437 days.

(21) Appl. No.: 15/875,976

(22) Filed: Jan. 19, 2018

(65) Prior Publication Data
US 2018/0313724 A1 Nov. 1, 2018

(30) Foreign Application Priority Data

Apr. 27, 2017 (CN) .......................... 2017 1 0287622

(51) Int. Cl.
*G01M 17/06* (2006.01)
*G07C 5/00* (2006.01)
(Continued)

(52) U.S. Cl.
CPC .............. *G01M 17/06* (2013.01); *G01S 17/08* (2013.01); *G06K 9/00791* (2013.01);
(Continued)

(58) Field of Classification Search
CPC .. G01M 17/06; G01M 17/007; G06K 9/6262; G06K 9/00791; G06K 9/00825; G01S 17/08; G01S 17/931; G01S 17/89
See application file for complete search history.

(56) References Cited

U.S. PATENT DOCUMENTS 8,412,449 B2 * 4/2013 Trepagnier .......... G05D 1/0248
701/301
9,587,952 B1 * 3/2017 Slusar .................... G06Q 40/08
(Continued)

FOREIGN PATENT DOCUMENTS

CN 202632107 12/2012
CN 103207090 7/2013

OTHER PUBLICATIONS

"Research on the Dynamic Update Algorithm of GIS Based on Environmental Perception of Autonomous Car, Qian XU, Master Thesis, Beijing Institute of Technology, Jan. 2015, ("基于无人车环境感知信息的GIS动态更新算法研究", 许谦, 中国优秀硕士学位论文全文数据库 基础科学辑, 第7期, 第12-19页, 2015/1)". (English Abstract Enclosed).

*Primary Examiner* — Thomas Ingram
(74) *Attorney, Agent, or Firm* — Knobbe, Martens, Olson & Bear, LLP

(57) ABSTRACT

The present disclosure discloses a testing method and apparatus applicable to a driverless vehicle. In some embodiments, the method comprises: sending, by a terminal, position information to the driverless vehicle at a test site; sending, to the driverless vehicle, environment perception information of a preset test event corresponding to a preset position when a position in a real driving environment corresponding to the driverless vehicle is the preset position, obtaining output information of a functional module, determining whether the functional module is normal based on a comparison result between the output information and preset information corresponding to the functional module. At the test site, one can test whether each functional module is normal when the driverless vehicle encounters various kinds of events in the real driving environment, thus avoiding the safety risk of the test in the real driving environment.

12 Claims, 6 Drawing Sheets

(51) Int. Cl.
  *G06K 9/00* (2006.01)
  *G01S 17/08* (2006.01)
  *G06K 9/62* (2006.01)
  *G01S 17/89* (2020.01)
  *G01S 17/931* (2020.01)

(52) U.S. Cl.
  CPC ....... *G06K 9/00825* (2013.01); *G06K 9/6262* (2013.01); *G07C 5/008* (2013.01); *G01S 17/89* (2013.01); *G01S 17/931* (2020.01)

(56) References Cited

U.S. PATENT DOCUMENTS

| | | | |
|---|---|---|---|
| 9,632,502 B1* | 4/2017 | Levinson | G05D 1/0027 |
| 2018/0136651 A1* | 5/2018 | Levinson | G05D 1/0027 |
| 2018/0336297 A1* | 11/2018 | Sun | B60W 30/00 |
| 2019/0163181 A1* | 5/2019 | Liu | G05D 1/0287 |

* cited by examiner

TESTING METHOD AND APPARATUS APPLICABLE TO DRIVERLESS VEHICLE

CROSS-REFERENCE TO RELATED APPLICATIONS

This application claims the benefit of Chinese Patent Application No. 201710287622.0, entitled "Testing Method and Apparatus Applicable to Driverless Vehicle," filed on Apr. 27, 2017, which is incorporated herein by reference in its entirety.

TECHNICAL FIELD

The present application relates to the vehicle field, specifically to the field of a vehicle testing, and more specifically to a testing method and apparatus applicable to a driverless vehicle.

BACKGROUND

Testing whether various functional modules of a driverless vehicle are normal is a key environment to ensure the safety of the driverless vehicle. However, there is a certain safety risk when the testing is performed on a real road, when the testing is performed on a simulated road, it is difficult to accurately test whether the various functional modules of the driverless vehicle are normal due to a difference between the test environments of the simulated road and the real road.

SUMMARY

Some embodiments of present application provide a testing method and apparatus applicable to a driverless vehicle to solve the problems in the above background technology.

In a first aspect, some embodiments of the present application provide a testing method applicable to a driverless vehicle, the method comprises: sending, by a terminal, position information to the driverless vehicle, the position information comprising a start position and an end position in a real driving environment; sending, to the driverless vehicle, environment perception information of a preset test event corresponding to a preset position when a position in a real driving environment corresponding to the driverless vehicle is the preset position, the preset position being a collecting position corresponding to the environment perception information collected at a start of the preset test event in the real driving environment; obtaining output information of a functional module and determining whether the functional module is normal based on a comparison result between the output information and preset information corresponding to the functional module, the output information obtained based on a functional module inputting the environment perception information to the driverless vehicle.

In a second aspect, some embodiments of the present application provide a testing method applicable to a driverless vehicle, the method comprises: receiving, by the driverless vehicle, position information sent by the driverless vehicle, the position information comprising a start position and an end position of the driverless vehicle in a real driving environment; sending, to the terminal, a preset position, and receiving environment perception information of a preset test event corresponding to a preset position returned by the terminal when a position in the real driving environment corresponding to the driverless vehicle is determined to be the preset position, the preset position being a collecting position corresponding to the environment perception information collected at a start of the preset test event in the real driving environment; inputting the environment perception information to a functional module of the driverless vehicle to obtain output information of the functional module and send the output information to the terminal.

In a third aspect, some embodiments of the present application provide a test apparatus applicable to a driverless vehicle, the apparatus comprises a position sending unit configured to send position information to the driverless vehicle, the position information comprising a start position and an end position in a real driving environment; a position sending unit configured to send, to the driverless vehicle, environment perception information of a preset test event corresponding to a preset position when a position in the real driving environment corresponding to the driverless vehicle is the preset position, the preset position being a collecting position corresponding to the environment perception information collected at a start of the preset test event in the real driving environment; a determining unit configured to obtain output information of a functional module and determine whether the functional module is normal based on a comparison result between the output information and preset information corresponding to the functional module, the output information obtained based on a functional module inputting the environment perception information to the driverless vehicle.

In a forth aspect, some embodiments of the present application provide a test device applicable to a driverless vehicle, the device comprises: a position receiving unit configured to receive position information sent by a terminal, the position information comprising a start position and an end position of the driverless vehicle in a real driving environment; an information transmitting unit configured to send, to the terminal, a preset position, and receive environment perception information of a preset test event corresponding to a preset position returned by the terminal when a position in the real driving environment the preset position being a collecting position corresponding to the environment perception information collected at a start of the preset test event in the real driving environment; an information processing unit configured to input the environment perception information to a functional module of the driverless vehicle to obtain output information of the functional module and send the output information to the terminal.

The testing method and apparatus applicable to the driverless vehicle provided by some embodiments of the present disclosure sends, by a terminal, the position information to the driverless vehicle at a test site; sends, to the driverless vehicle, the environment perception information of the preset test event corresponding to the preset position when the position in the real driving environment corresponding to the driverless vehicle is the preset position, obtains the output information of the functional module and determines whether the functional module is normal based on the comparison result between the output information and the preset information corresponding to the functional module. At the test site, one tests whether each functional module is normal when the driverless vehicle encounters various types of events in the real driving environment, thus avoiding the safety risk of the test in the real driving environment.

BRIEF DESCRIPTION OF THE DRAWINGS

Other features, objectives and advantages of the present disclosure will become more apparent upon reading the detailed description to non-limiting embodiments made with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
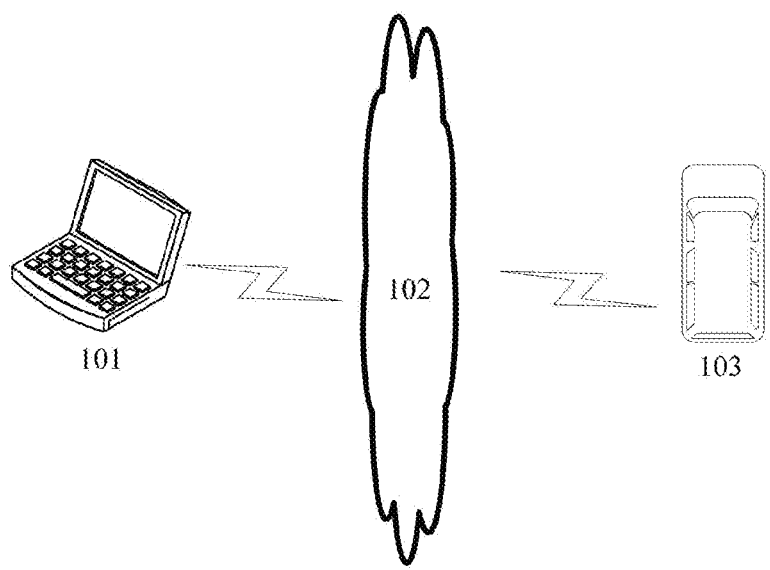
FIG. 1 shows an architectural diagram of a system applicable to a driverless vehicle in which some embodiments of the present disclosure may be implemented.

FIG. 1 shows an architectural diagram of a system applicable to a driverless vehicle in which some embodiments of the present disclosure may be implemented.

As shown in FIG. 1, the system architecture may include a terminal 101, a network 102 and a driverless vehicle 103. The network 102 serves as a medium providing a communication link between the terminal 101 and the driverless vehicle 103. The network 102 may employ a wireless communication link.

The terminal 101 pre-stores a road condition image captured in a real driving environment collected by a camera and a laser point cloud collected by a laser radar. The driverless vehicle 103 is equipped with a GPS, an inertial navigation apparatus, a camera, a laser radar and other equipment. The GPS and the inertial navigation apparatus may be configured to obtain the position and pose of the driverless vehicle, the camera may be configured to collect a road condition image, the laser radar may be configured to collect a laser point cloud. A control system of the driverless vehicle 103 comprises: a main control module and a communication module, an image recognition module, a distance measuring module, a driving decision module and other functional modules running on a vehicle-mounted operating system of the driverless vehicle 103. The main control module may be configured to input information output by one functional module to another functional module and input the obtained information to one functional module. The communication module may be configured to receive information sent by the terminal. The image recognition module may be configured to identify objects such as a vehicle and a traffic sign in the road condition image collected by the camera. The distance measuring module may be configured to measure a distance between vehicles and the driverless vehicle based on the laser point cloud. The driving decision module may be configured to control the driving of the driverless vehicle.

Figure 2:
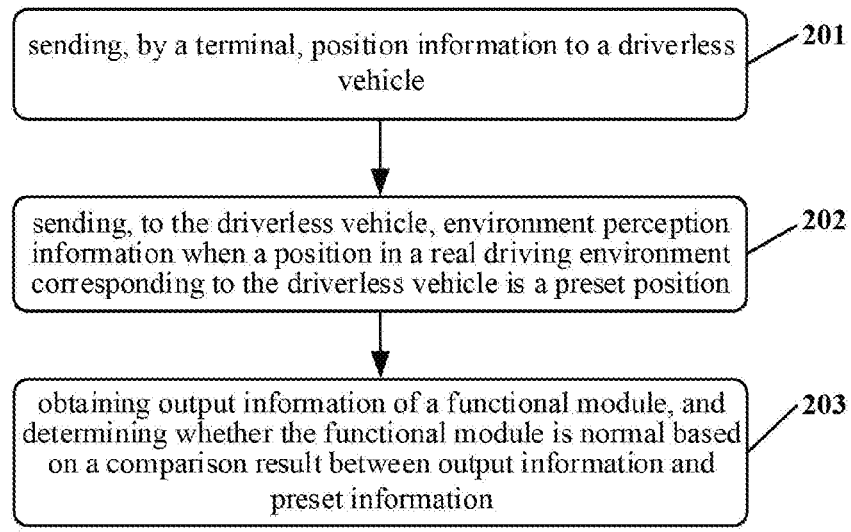
FIG. 2 shows a flow chart of a testing method applicable to a driverless vehicle according to some embodiments of the present disclosure.

Referring to FIG. 2, which shows a flow chart of an embodiment of the testing method applicable to the driverless vehicle based on some embodiments of the present disclosure. It should be noted that the testing method applicable to the driverless vehicle provided by some embodiments of the present disclosure may be executed by a terminal, for example, the terminal 101 in FIG. 1. The method comprises the following steps:

Step 201: sending, by a terminal, position information to the driverless vehicle.

In this embodiment, the driverless vehicle is positioned at a test site, when the functional module of the driverless vehicle is tested at the test site, the position information sent by the terminal to the driverless vehicle comprises a start position and an end position of the driverless vehicle in the real driving environment. The real driving environment refers to the driving environment when the driverless vehicle moves on a real road.

In this embodiment, the communication module of the driverless vehicle may receive the position information sent by the terminal. The driving decision module of the driverless vehicle may determine a driving route of the driverless vehicle in the real driving environment according to a start position and an end position in the real driving environment and the positions of various real road sections defined in a high-definition map, and control the driving of the driverless vehicle according to the position of a lane line of each road section on the driving route in the real driving environment defined in the high-definition map and a road topology structure of a road section. In other words, it is possible to equally test the driverless vehicle by superimposing the position of the lane line of the road section on the driving route in the real driving environment defined in the high-definition map and the road topology structure of the road section with the test site of the driverless vehicle. A driving track of the driverless vehicle at the test site determined by the driving decision module may be equivalent to the driving track of the driverless vehicle on the driving route. Each position traveled by the driverless vehicle at the test site may correspond to the position determined by the driverless vehicle's driving decision module in the real driving environment.

Step 202: sending, to the driverless vehicle, the environment perception information when the position in the real driving environment corresponding to the driverless vehicle is the preset position.

In this embodiment, the GPS and the inertial navigation apparatus on the driverless vehicle may obtain the translation of the driverless vehicle in real time. The driving decision module of the driverless vehicle may add the real-time acquired translation of the driverless vehicle to the start position in the real driving environment to obtain a position corresponding to the driverless vehicle in the real driving environment.

In this embodiment, when the driving decision module of the driverless vehicle at the test site determines that the position of the real driving environment corresponding to the driverless vehicle is the preset position, the driverless vehicle at the test site may send the preset position to the terminal via the communication module. The terminal may send, to the driverless vehicle, the environment perception information of the preset event corresponding to the preset position. The preset position is a collecting position corresponding to the environment perception information collected at a start of the corresponding preset test event. The environment perception information comprises: a road condition image of the real driving environment collected during a time period between the start and the end of the preset test event corresponding to the preset position, and laser point cloud data of a laser point cloud of the real driving environment collected during the time period between the start and the end of the preset test event corresponding to the preset position. The laser point cloud data comprise the three-dimensional coordinates of a laser point in the laser point cloud in a world coordinate system.

In some optional implementations of this embodiment, the environment perception information may be collected in advance by a driver driving the driverless vehicle in a manual driving mode. When the driver drives the driverless vehicle in the manual driving mode, the driver may use the camera to collect the road condition image of the real driving environment, use the laser radar to collect the laser point cloud data of the laser point cloud and record the collection time of an image and the laser point cloud at the same time.

In this embodiment, when the environmental perception information is collected in advance by the driver driving the driverless vehicle in the manual driving mode, the collecting position corresponding to the environment perception information collected at the start of the preset test event is a position of the driverless vehicle in the manual driving mode in the real driving environment at the start of the preset test event.

For example, when the type of the environmental perception information is the laser point cloud data of the laser point cloud, the environmental perception information is collected in advance by the driverless vehicle in the manual driving mode, the preset test event is an event where a vehicle enters a lane on which the driverless vehicle in the manual driving mode moves. When the driver drives the driverless vehicle in the manual driving mode on a route between the start position and the end position, the vehicle enters the lane on which the driverless vehicle in the manual driving mode moves, at a closer distance from the driverless vehicle in the manual driving mode.

The preset position corresponding to the preset test event is a position of the driverless vehicle in the manual driving mode in the real driving environment at the start when the vehicle enters the lane on which the driverless vehicle in the manual driving mode moves (e.g., the preset test event). The environmental perception information of the preset test event sent by the terminal to the driverless vehicle at the test site is the laser point cloud data of the laser point cloud of the real driving environment collected by the laser radar of the driverless vehicle in the manual driving mode during the time period between the start, that is, an operation moment when the vehicle starts to enter the lane on which the driverless vehicle in the manual driving mode moves, and the end, that is, a moment when the vehicle enters the lane on which the driverless vehicle in the manual driving mode moves.

In other words, in Step 201, it is possible to equally test the driverless vehicle by superimposing the position of the lane line of the road section on the driving route in the real driving environment defined in the high-definition map and the road topology structure of the road section onto the test site of the driverless vehicle, a driving track of the driverless vehicle at the test site determined by the driving decision module may be equivalent to the driving track of the driverless vehicle on the driving route. Each position traveled by the driverless vehicle drives at the test site may correspond to the position in the real driving environment. When the driving decision module of the driverless vehicle determines that the position in the real driving environment corresponding to the driverless vehicle is the preset position, and transmits the laser point cloud of the real driving environment collected previously by the driverless vehicle in the manual driving mode at the test site to the driverless vehicle, it is equivalent to the driverless vehicle at the start when the driverless vehicle in the manual driving mode in the real driving environment moves to entering the lane on which the driverless vehicle moves, at the location where the driverless vehicle in the real driving environment is in a manual driving mode, the event of the vehicle entering the lane on which the driverless vehicle moves occurs, and the laser point cloud data of the laser point cloud of the real driving environment collected between the start and the end when the preset test event collected previously is sent to the driverless vehicle.

As another example, when the type of the environmental perception information is the road condition image, the preset test event is an event where a traffic light turns from green to red. The preset position corresponding to the preset test event is a position of the driverless vehicle in the manual driving mode driven by the driver in the real driving environment at the start when the preset test event is the event where the traffic light turns from the green to the red. The environmental perception information of the preset test event sent to the driverless vehicle at the test site may be: the road condition image of the real driving environment collected by the camera of the driverless vehicle in the manual driving mode driven by the driver during a time period between the start and the end of the event where the traffic light turns from the green to the red, the road condition image of the real driving environment comprises an object of the traffic light at this intersection.

Step 203: obtaining output information of the functional module, and determining whether the functional module is normal based on a comparison result between the output information and preset information.

In this embodiment, after the terminal sends the environment perception information to the driverless vehicle via Step 202, the main control module of the driverless vehicle may input the environment perception information into the functional module to obtain the output information of the functional module. The communication module of the driverless vehicle may then send the output information of the functional module to the terminal, so as to be able to obtain the output information to the output information of the functional module, and compare the output information of the functional module with the preset information corresponding to the functional module to determine whether the function module is normal.

For example, when the type of the environmental perception information is the laser point cloud, the environmental perception information is collected in advance by the driverless vehicle in the manual driving mode, the preset test event is the event where the vehicle enters the lane on which the driverless vehicle in the manual driving mode moves, an object corresponding to the preset test event is the vehicle entering the lane on which the driverless vehicle in the manual driving mode moves, when the driving decision module determines that the position in the real driving environment corresponding to the driverless vehicle is the preset position corresponding to the preset test event, the environmental perception information of the preset test event sent by the terminal to the driverless vehicle at the test site may be: the laser point cloud of the real driving environment collected by the laser radar of the driverless vehicle in the manual driving mode driven by the driver during the time period between the start and the end when the vehicle enters the lane on which the driverless vehicle in the manual driving mode moves, the laser point cloud of the real driving environment comprises a laser point of a laser projected onto the vehicle, that is, the laser point cloud of the real driving environment comprises the laser point corresponding to the vehicle, the laser point cloud data of the laser point cloud comprise the three-dimensional coordinates of the laser point corresponding to the vehicle in the world coordinate system.

The main control module of the driverless vehicle may input the laser point cloud to the distance measuring module, the distance measuring module may use the position in the real environment corresponding to the driverless vehicle as the coordinate of the center point of the laser radar and obtain the output information of the distance measuring module based on the three-dimension coordinates of the laser point corresponding to the vehicle in the world coordinate system in the laser point cloud data of the laser point cloud. The output information of the distance measuring module comprises the distance between the vehicle and the driverless vehicle and the azimuths thereof.

The preset information corresponding to the distance measuring module may be: the distance between the object corresponding to the preset test event determined in advance, that is, the vehicle that enters the lane on which the driverless vehicle in the manual driving mode moves, and the driverless vehicle in the manual driving mode, and the azimuths thereof. For example, the conversion relationship of the pose of the central point of the laser radar corresponding to the laser point cloud that may be collected based on the start and the end, the coordinates of the laser point corresponding to the vehicle in the laser point cloud data in the world coordinate system, the distance between the vehicle incorporated into the lane on which the driverless vehicle in the manual driving mode moves, and the driverless vehicle in the manual driving mode, and the azimuths thereof.

The preset information corresponding to the driving decision module may be: a control information of the driverless driving in the manual driving mode driven by the driver obtained in advance, when the event where the vehicle enters the lane on which the driverless vehicle moves occurs, that is, deceleration. For example, for the driverless vehicle in the manual driving mode driven by the driver, when the preset test event occurs, the driver releases a clutch pedal on the driverless vehicle in the manual driving mode to decelerate. In this case, a speed sensor in the driverless vehicle detects that the driverless vehicle in the manual driving mode is decelerated, and generates the control information indicating deceleration as the preset information corresponding to the driving decision module.

In this embodiment, the output information of the distance measuring module may be compared with the preset information corresponding to the distance measuring module, when the output information of the distance measuring module is consistent with the preset information corresponding to the distance measuring module, it may be determined that the distance measuring module is normal. When the output information of the distance measuring module is inconsistent with the preset information corresponding to the distance measuring module, it may be determined that the distance measuring module is abnormal.

In this embodiment, when the distance measuring module is normal, the output information of the driving decision module may be compared with the preset information corresponding to the driving decision module, when the output information of the driving decision module is consistent with the preset information corresponding to the driving decision module, it may be determined that the driving decision module is normal. When the output information of the driving decision module is inconsistent with the preset information corresponding to the driving decision module, it may be determined that the driving decision module is abnormal.

For another example, when the type of the environmental perception information is the road condition image, the preset test event is the event where the traffic light turns from the green to the red, the object corresponding to the preset test event is the traffic light. When the driving decision module determines that the position in the real driving environment corresponding to the driverless vehicle is the preset position corresponding to the preset test event, the environmental perception information of the preset test event sent by the terminal to the driverless vehicle at the test site may the road condition image of the real driving environment collected by the camera of the driverless vehicle in the manual driving mode driven by the driver during the time period between the start and the end of the event where the traffic light at a closer distance from one intersection turns from the green to the red, the road condition image comprises the object of the traffic light at this intersection. The driverless vehicle may input the laser point cloud to the image recognition module. The output information of the image recognition module comprises: an on/off status of each of the traffic lights at the start time and the end time of the event where the traffic light turns from the green to the red.

The preset information corresponding to the image recognition module comprises: the color of the traffic light is turned from the green to the red.

In this embodiment, the output information of the image recognition module may be compared with the preset information corresponding to the image recognition module, when the output information of the image recognition module is consistent with the preset information corresponding to the image recognition module, it may be determined that the image recognition module is normal.

In this embodiment, when the image recognition module is normal, the output information of the driving decision module may be compared with the preset information corresponding to the driving decision module, when the output information of the driving decision module is consistent with the preset information corresponding to the driving decision module, it may be determined that the driving decision module is normal.

In this embodiment, after the terminal sends the start position and the end position in the real driving environment to the driverless vehicle at the test site in Step 201, it is possible to equally test the driverless vehicle by superimposing the position of the lane line of the road section on the driving route in the real driving environment defined in the high-definition map and the road topology structure of the road section onto the test site of the driverless vehicle, the driving track of the driverless vehicle at the test site determined by the driving decision module may be equivalent to the driving track of the driverless vehicle on the driving route. Each position traveled by the driverless vehicle drives at the test site may correspond to the position in the real driving environment. When the position of the real driving environment corresponding to the position traveled by the driverless vehicle at the test site determined by the driving decision module is the preset position where the preset test event occurs, the terminal may send, in advance of the preset position, the environmental perception information collected during the time period between the start time and the end time of the preset test event to the driverless vehicle running at the test site and thus may be equivalent to the preset test event occurring at the position traveled by the driverless driver at the test site determined by the driver decision module, to further test whether the functional module of the driverless vehicle is normal at the test site.

Figure 3:
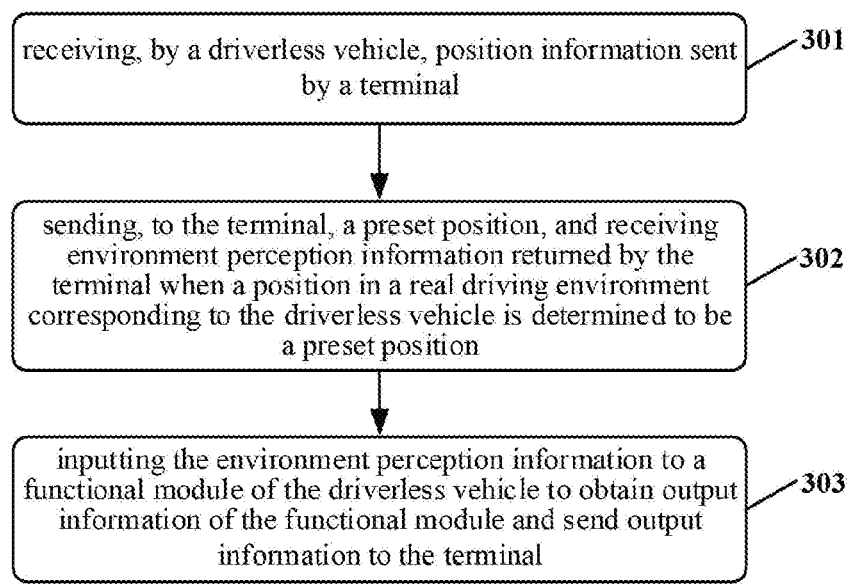
FIG. 3 shows a flow chart of a testing method applicable to a driverless vehicle according to some embodiments of the present disclosure.

Referring to FIG. 3, which shows a flow chart of a testing method applicable to a driverless vehicle according to some embodiments of the present disclosure. The testing method applicable to the driverless vehicle provided by some embodiments of the present disclosure may be executed by the driverless vehicle, for example, the driverless vehicle 103 in FIG. 1. The method comprises the following steps:

Step 301: receiving, by the driverless vehicle, position information sent by a terminal.

In this embodiment, the driverless vehicle is positioned at the test site. When the functional module of the driverless vehicle at the test site is tested, the communication module of the driverless vehicle may first be utilized to receive the position information sent by the terminal. The position information comprises the start position and the end position in the real driving environment. The real driving environment refers to the driving environment when the driverless vehicle moves on the real road.

The driving decision module of the driverless vehicle may determine the driving route of the driverless vehicle in the real driving environment according to the start position and the end position in the real driving environment and the positions of various real road sections defined in the high-definition map, and control the driving of the driverless vehicle according to the position of the lane line of each road section on the driving route in the real driving environment defined in the high-definition map and the road topology structure of the road section. In other words, it is possible to equally test the driverless vehicle by superimposing the position of the lane line of the road section on the driving route in the real driving environment defined in the high-definition map and the road topology structure of the road section onto the test site of the driverless vehicle, the driving track of the driverless vehicle at the test site determined by the driving decision module may be equivalent to the driving track of the driverless vehicle on the driving route, Each position traveled by the driverless vehicle at the test site may correspond to the position determined by one driverless vehicle's driving decision module in the real driving environment.

Step 302: sending, to the terminal, the preset position, and receiving environment perception information returned by the terminal when the position in the real driving environment corresponding to the driverless vehicle is determined to be the preset position.

In this embodiment, the GPS and the inertial navigation apparatus on the driverless vehicle may obtain the translation of the driverless vehicle in real time. The driving decision module of the driverless vehicle may add the real-time acquired translation of the driverless vehicle to the start position in the real driving environment to obtain the position corresponding to the driverless vehicle in the real driving environment.

In this embodiment, when the driving decision module of the driverless vehicle determines that the position of the real driving environment corresponding to the driverless vehicle is the preset position, the preset position may be sent to the terminal via the communication module of the driverless vehicle, and then, the environment perception information of the preset event corresponding to the preset position returned by the terminal may be received via the communication module of the driverless vehicle. The preset position may be the collecting position corresponding to the environment perception information collected at the start of the preset test event. The environment perception information comprises: the road condition image of the real driving environment collected during the time period between the start and the end of the preset test event corresponding to the preset position, and the laser point cloud data of the laser point cloud of the real driving environment collected during the time period between the start and the end of the preset test event corresponding to the preset position. The laser point cloud data comprise the three-dimensional coordinates of the laser point in the laser point cloud in the world coordinate system.

In this embodiment, the environment perception information may be collected in advance by the driver driving the driverless vehicle in the manual driving mode. When the driver drives the driverless vehicle in the manual driving mode, the driver may use the camera to collect the road condition image of the real driving environment, use the laser point cloud data of the laser point cloud collected by the laser radar and record the collection time of the image and the laser point cloud at the same time. When the environmental perception information is collected in advance by the driver driving the driverless vehicle in the manual driving mode, the collecting position corresponding to the environment perception information collected at the start of the preset test event is the position of the driverless vehicle in the manual driving mode in the real driving environment at the start of the preset test event.

Using the type of environment-aware information being the laser point cloud data of the laser point cloud, and the environment perception information collected in advance by the driverless vehicle in the manual driving mode as an example, the preset testing event is the event where the vehicle enters the lane on which the driverless vehicle moves, when the driver drives the driverless vehicle in the manual driving mode on the route between the start position and the end position, the vehicle enters the lane on which the driverless vehicle in the manual driving mode moves, at the closer distance from the driverless vehicle in the manual driving mode. The preset position corresponding to the preset test event is the position of the driverless vehicle in the manual driving mode in the real driving environment at the start when the vehicle enters the lane on which the driverless vehicle in the manual driving mode moves. The environmental perception information of the preset test event returned by the terminal received by the driverless vehicle at the test site is the laser point cloud data of the laser point cloud of the real driving environment collected by the laser radar of the driverless vehicle in the manual driving mode during the time period between the start, that is, an operation moment when the vehicle is driven to enter the lane on which the driverless vehicle in the manual driving mode moves, and the end, that is, a moment when the vehicle enters the lane on which the driverless vehicle in the manual driving mode moves.

Step 303: inputting the environment perception information to the functional module of the driverless vehicle to obtain output information of the functional module and send the output information to the terminal.

In this embodiment, after the environment perception information returned by the terminal is received in Step 302, the environment perception information may be input into the functional module of the driverless vehicle to obtain the output information of the functional module. The output information of the functional module may be sent to the terminal. The output information of the functional module is compared with the preset information corresponding to the functional module on the terminal to determine whether the functional module is normal.

For example, when the type of the environmental perception information is the laser point cloud, the environmental perception information is collected in advance by the driverless vehicle in the manual driving mode, the preset test event is the event where the vehicle enters the lane of the driverless vehicle in the manual driving mode, the object corresponding to the preset test event is the vehicle. When the driving decision module determines that the position in the real driving environment corresponding to the driverless vehicle at the test site is the preset position corresponding to the preset test event, the environmental perception information sent by the terminal received by the driverless vehicle at the test site may be the laser point cloud of the real driving environment collected by the laser radar of the driverless vehicle in the manual driving mode driven by the driver during the time period between the start and the end when the vehicle enters the lane on which the driverless vehicle in the manual driving mode moves, the laser point cloud of the real driving environment comprises a laser point of a laser projected onto the vehicle, that is, the laser point corresponding to the vehicle comprised by the laser point cloud of the real driving environment. The laser point cloud data of the laser point cloud comprise the three-dimensional coordinates of the laser point corresponding to the vehicle in the world coordinate system.

The main control module of the driverless vehicle at the test site may input the laser point cloud to the distance measuring module, the distance measuring module may use the position in the real environment corresponding to the driverless vehicle as the coordinate of the center point of the laser radar and obtain the output information of the distance measuring module based on the three-dimension coordinates of the laser point corresponding to the vehicle in the world coordinate in the laser point cloud data of the laser point cloud. The output information of the distance measuring module comprises the distance between the vehicle and the driverless vehicle and the azimuths thereof.

After the output information of the distance measuring module is obtained, the output information of the distance measuring module may be sent to the terminal, the output information of the functional module is compared with the preset information corresponding to the functional module on the terminal to determine whether the functional module is normal. The preset information corresponding to the distance measuring module may be: the distance between the object corresponding to the preset test event determined in advance, that is, the vehicle that enters the lane on which the driverless vehicle in the manual driving mode moves, and the driverless vehicle in the manual driving mode, and the azimuths thereof. For example, the conversion relationship of the pose of the central point of the laser radar corresponding to the laser point cloud that may be collected based on the start and the end, the coordinates of the laser point corresponding to the vehicle in the laser point cloud data in the world coordinate system, the distance between the vehicle incorporated into the lane on which the driverless vehicle in the manual driving mode moves, and the driverless vehicle, and the azimuths thereof.

On the terminal, the output information of the distance measuring module may be compared with the preset information corresponding to the distance measuring module, when the output information of the distance measuring module is consistent with the preset information corresponding to the distance measuring module, it may be determined that the distance measuring module is normal. When the output information of the distance measuring module is inconsistent with the preset information corresponding to the distance measuring module, it may be determined that the distance measuring module is abnormal.

Figure 4:
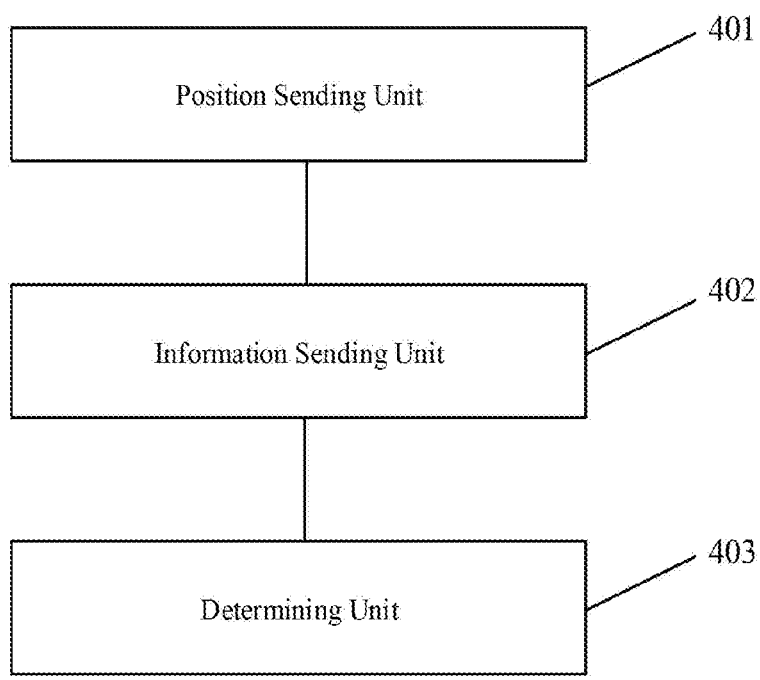
FIG. 4 shows a structural diagram of a testing apparatus applicable to a driverless vehicle according to some embodiments of the present disclosure.

Referring to FIG. 4, which shows a structural diagram of some embodiments of the testing apparatus applicable to the driverless vehicle based on the present disclosure. The testing apparatus applicable to the driverless vehicle comprises a position sending unit 401, an information sending unit 402, and a determining unit 403. The position sending unit is configured to send the position information to the driverless vehicle, the position information comprises the start position and the end position in the real driving environment; a position sending unit 402 is configured to send, to the driverless vehicle, the environment perception information of the preset test event corresponding to the preset position when the position in the real driving environment corresponding to the driverless vehicle is the preset position, the preset position is the collecting position corresponding to the environment perception information collected at the start of the preset test event in the real driving environment; the determining unit 403 is configured to obtain the output information of the functional module and determine whether the functional module is normal based on the comparison result between the output information and the preset information corresponding to the functional module, the output information is obtained based on the functional module inputting the environment perception information to the driverless vehicle.

Figure 5:
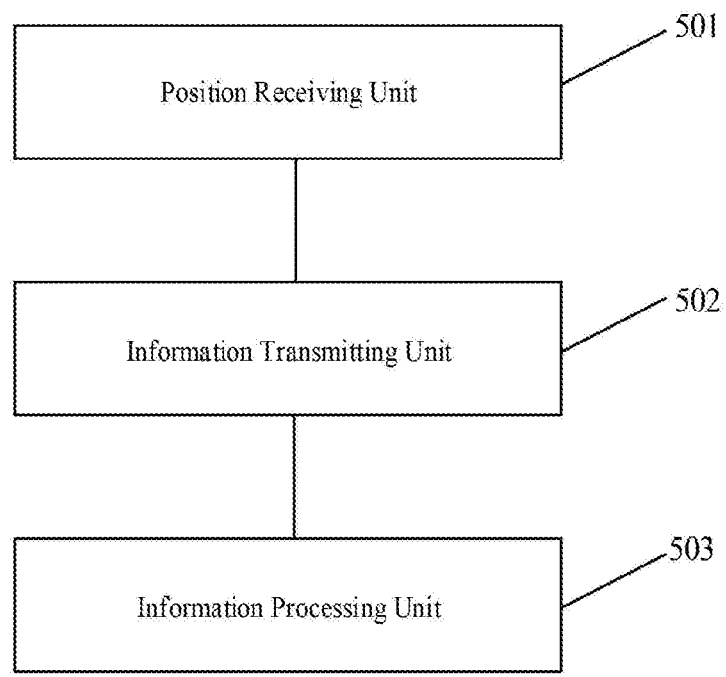
FIG. 5 shows a structural diagram of a testing apparatus applicable to a driverless vehicle according to some embodiments of the present disclosure.

Referring to FIG. 5, which shows a structural diagram of some embodiments of the testing apparatus applicable to the driverless vehicle based on the present application. The testing apparatus applicable to the driverless vehicle comprises a position receiving unit 501, an information transmitting unit 502, and an information processing unit 503. The position receiving unit 501 is configured to receive the position information sent by the terminal, the position information comprises the start position and the end position of the driverless vehicle in the real driving environment; an information transmitting unit 502 is configured to send, to the terminal, the preset position, and receive the environment perception information of the preset test event corresponding to the preset position returned by the terminal when the position in the real driving environment corresponding to the driverless vehicle is determined to be the preset position, the preset position is the collecting position corresponding to the environment perception information collected at the start of the preset test event in the real driving environment; the information processing unit 503 is configured to input the environment perception information to the functional module of the driverless vehicle to obtain output information of the functional module and send the output information to the terminal.

Figure 6:
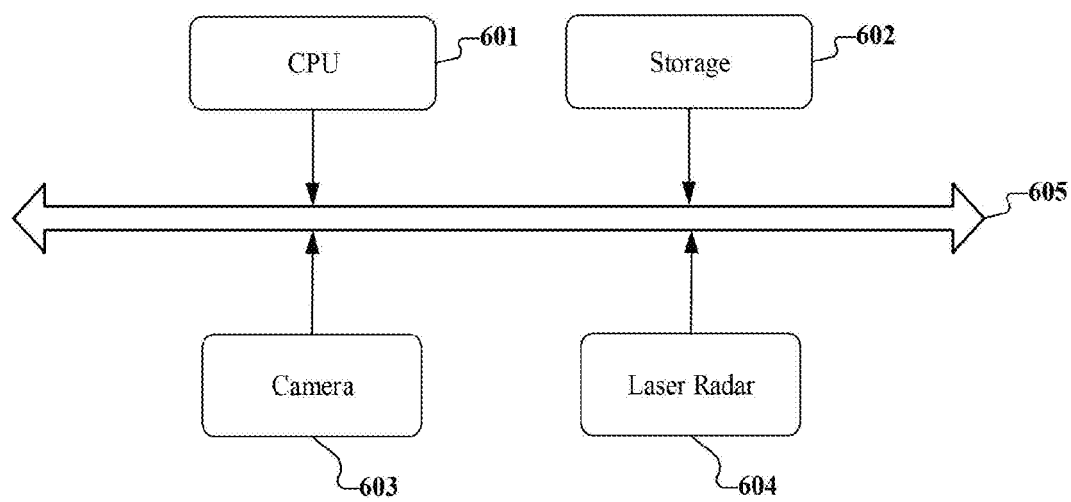
FIG. 6 shows a structural diagram of a hardware applicable to a driverless vehicle of some embodiments of the present disclosure.

Referring to FIG. 6, which shows a structural diagram of a hardware of the driverless vehicle applicable to some embodiments the present disclosure.

As shown in FIG. 6, the driverless vehicle comprises a CPU 601, a storage 602, a camera 603, and a laser radar 604.

The CPU 601, the storage 602, the camera 603, and the laser radar 604 are connected via a bus 605. The testing method applicable to the driverless vehicle based on some embodiments of the present disclosure may be realized as a computer program, the computer program comprises operation instructions described in the above embodiments. The computer program may be stored in the storage 602. The CPU 601 of the driverless vehicle tests, by calling the computer program stored in the storage 602, whether each functional module of the driverless vehicle in the real driving environment at the test site is normal.

Some embodiments of the present disclosure also provide a terminal, the terminal may comprise a testing apparatus applicable to a driverless vehicle described in FIG. 4. The terminal may be provided with one or more processors. A storage is configured to store one or more programs, one or more programs may comprise an instruction to perform an operation described in Steps 201-203 above. When one or more programs are executed by one or more processors, one or more processors are caused to perform the operation described in Steps 201-203 above.

Some embodiments of the present disclosure further provide a driverless vehicle, the driverless vehicle may comprises a testing apparatus applicable to a driverless vehicle described in FIG. 5. The driverless vehicle may be provided with one or more processors; a storage is configured to store one or more programs, one or more programs may comprise instructions to perform operations described in Steps 301-303 above. When one or more programs are executed by the one or more processors, the one or more processors are caused to perform the operations described in Steps 301-303 above.

Some embodiments of present disclosure further provide a computer readable medium, the computer readable medium may be comprised in the terminal or may be alone. The computer readable medium bears one or more programs, when one or more programs are executed by the terminal, position information may be sent to a driverless vehicle, the position information comprises a start position and an end position in a real driving environment; environment perception information of a preset test event corresponding to a preset position is sent to the driverless vehicle when a position in the real driving environment corresponding to the driverless vehicle is the preset position, the preset position is a collecting position corresponding to the environment perception information collected at a start of the preset test event in the real driving environment; output information of a functional module is obtained, and whether the functional module is normal based on a comparison result between the output information and preset information corresponding to the functional module is determined, the output information is obtained based on the functional module inputting the environment perception information to the driverless vehicle.

Some embodiments of present disclosure further provide a computer readable medium, the computer readable medium may be comprised in a driverless vehicle or may be alone. The computer readable medium bears one or more programs, when one or more programs are executed by a CPU of the driverless vehicle, position information sent by a terminal may be received, the position information comprises a start position and an end position of the driverless vehicle in a real driving environment; when a position in the real driving environment corresponding to the driverless vehicle is determined to be a preset position, the preset position is sent to the terminal, and environment perception information of a preset test event corresponding to the preset position returned by the terminal is received, the preset position is a collecting position corresponding to the environment perception information collected at a start of the preset test event in the real driving environment; the environment perception information is sent to a functional module of the driverless vehicle to obtain output information of the functional module and send the output information to the terminal.

It should be noted that the non-volatile computer readable medium in the present disclosure may be computer readable signal medium or non-volatile computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the non-volatile computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the non-volatile computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A testing method applicable to a driverless vehicle, the method comprising:
sending, by a terminal, position information to the driverless vehicle, the position information comprising a start position and an end position in a real driving environment;
sending, by the terminal, to the driverless vehicle, environment perception information of a real driving environment of a preset test event corresponding to a preset position in response to determining that a position in the real driving environment corresponding to the driverless vehicle is the preset position, for the driverless vehicle to input the environment perception information of the real driving environment of the preset test event into a functional module of the driverless vehicle, the preset position being a collecting position corresponding to the environment perception information collected at a start of the preset test event in the real driving environment, wherein the environment perception information of the real driving environment of the preset test event sent to the driverless vehicle is pre-collected in the real driving environment of the preset test event;
obtaining output information of the functional module of the driverless vehicle, and
determining whether the functional module of the driverless vehicle is normal based on a comparison result between the output information and preset information corresponding to the functional module of the driverless vehicle.

2. The method according to claim 1, wherein the environment perception information comprises at least one of: a road condition image of the real driving environment pre-collected during a time period between the start and the end of the preset test event corresponding to the preset position, or laser point cloud data of a laser point cloud of the real driving environment pre-collected during the time period between the start and the end of the preset test event corresponding to the preset position.

3. The method according to claim 2, wherein the method further comprises:
using the road condition image collected by a camera of the driverless vehicle at a collecting time during the time period as the road condition image in the environment perception information, in response to determining that the driverless vehicle in a manual driving mode driven by a driver travels to the preset position in the real driving environment, and
using a laser point cloud data of a laser point cloud collected by a laser radar at a collecting time during the time period as the laser point cloud data in the environment perception information, in response to determining that the driverless vehicle in a manual driving mode travels to the preset position in the real driving environment.

4. The method according to claim 3, wherein the functional module comprises an image recognizer, a distance measurer and a driving decisioner, and the preset information corresponding to the functional module comprises: attribute information of an object in a predetermined road condition image corresponding to the image recognizer, a distance between an object corresponding to a predetermined preset test event corresponding to the distance measurer and the driverless vehicle in the manual driving mode, and control information in a preset duration after the driverless vehicle in the manual driving mode corresponding to the driving decisioner travels to the preset position of the real driving environment.

5. The method according to claim 4, wherein the output information of the functional module comprises the attribute information of the object in the predetermined road condition image output by the image recognizer, the distance between the object corresponding to the preset test event output by the distance measurer and the driverless vehicle, and a driving decision instruction output by the driving decisioner.

6. A testing method applicable to a driverless vehicle, the method comprising:
receiving, by the driverless vehicle, position information sent by a terminal, the position information comprising a start position and an end position of the driverless vehicle in a real driving environment;
sending, to the terminal, a preset position, and receiving environment perception information of a real driving environment of a preset test event corresponding to a preset position returned by the terminal in response to determining that a position in the real driving environment corresponding to the driverless vehicle is the preset position, the preset position being a collecting position corresponding to the environment perception information collected at a start of the preset test event in the real driving environment, wherein the environment perception information of the real driving environment of the preset test event sent to the driverless vehicle is pre-collected in the real driving environment of the preset test event; and
inputting the environment perception information to a functional module of the driverless vehicle to obtain output information of the functional module, and sending the output information to the terminal.

7. A testing apparatus applicable to a driverless vehicle, the apparatus comprising:
at least one processor; and
a memory storing instructions, the instructions when executed by the at least one processor, cause the at least one processor to perform operations, the operations comprising:
sending position information to the driverless vehicle, the position information comprising a start position and an end position in a real driving environment;
sending, by a terminal, to the driverless vehicle, environment perception information of a preset test event corresponding to a preset position in response to determining that a position in the real driving environment corresponding to the driverless vehicle is the preset position, for the driverless vehicle to input the environment perception information into a functional module of the driverless vehicle, the preset position being a collecting position corresponding to the environment perception information collected at a start of the preset test event in the real driving environment, wherein the environment perception information of the real driving environment of the preset test event sent to the driverless vehicle is pre-collected in the real driving environment of the preset test event; and
obtaining output information of the functional module of the driverless vehicle and determining whether the functional module of the driverless vehicle is normal based on a comparison result between the output information and preset information corresponding to the functional module.

8. The apparatus according to claim 7, wherein the environment perception information comprises at least one of: a road condition image of the real driving environment pre-collected during a time period between the start and the end of the preset test event corresponding to the preset position, or laser point cloud data of a laser point cloud of the real driving environment pre-collected during the time period between the start and the end of the preset test event corresponding to the preset position.

9. The apparatus according to claim 8, wherein the operations further comprise:
using the road condition image collected by a camera of the driverless vehicle at a collecting time during the time period as the road condition image in the environment perception information, when the driverless vehicle in a manual driving mode driven by a driver travels to the preset position in the real driving environment, and
using a laser point cloud data of a laser point cloud collected by a laser radar at a collecting time during the time period as the laser point cloud data in the environment perception information, when the driverless vehicle in a manual driving mode travels to the preset position in the real driving environment.

10. The apparatus according to claim 9, wherein the functional module comprises an image recognition module, a distance measurement module and a driving decision module, the preset information corresponding to the functional module comprises: attribute information of an object in a predetermined road condition image corresponding to the image recognition module, a distance between an object corresponding to a predetermined preset test event corresponding to the distance measurement module and the driverless vehicle in the manual driving mode, and control information in a preset duration after the driverless vehicle in the manual driving mode corresponding to the driving decision module travels to the preset position of the real driving environment.

11. The apparatus according to claim 10, wherein the output information of the functional module comprises the attribute information of the object in the predetermined road condition image output by the image recognition module, the distance between the object corresponding to the preset test event output by the distance measurement module and the driverless vehicle, and a driving decision instruction output by the driving decision module.

12. A testing apparatus applicable to a driverless vehicle, the apparatus comprising:
at least one processor; and
a memory storing instructions, the instructions when executed by the at least one processor, cause the at least one processor to perform operations, the operations comprising:
receiving, by the driverless vehicle, position information sent by a terminal, the position information comprising a start position and an end position of the driverless vehicle in a real driving environment;
sending, to the terminal, a preset position, and receive environment perception information of a preset test event corresponding to a preset position returned by the terminal in response to determining that a position in the real driving environment corresponding to the driverless vehicle is the preset position, the preset position being a collecting position corresponding to the environment perception information collected at a start of the preset test event in the real driving environment, wherein the environment perception information of the real driving environment of the preset test event sent to the driverless vehicle is pre-collected in the real driving environment of the preset test event; and
inputting the environment perception information to a functional module of the driverless vehicle to obtain output information of the functional module, and sending the output information to the terminal.

* * * * *